(12) United States Patent
Foxen et al.

(10) Patent No.: US 9,428,025 B2
(45) Date of Patent: Aug. 30, 2016

(54) AXLE SUSPENSION

(71) Applicant: DEERE & COMPANY, Moline, IL (US)

(72) Inventors: Jacob J. Foxen, Parkersburg, IA (US); Douglas R. Fischer, Dike, IA (US); Thomas Butts, Waverly, IA (US); Donald E. Young, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/459,938

(22) Filed: Aug. 14, 2014

(65) Prior Publication Data

US 2016/0046168 A1 Feb. 18, 2016

(51) Int. Cl.
*B60G 17/0165* (2006.01)
*B60G 17/015* (2006.01)

(52) U.S. Cl.
CPC ....... *B60G 17/0165* (2013.01); *B60G 17/0152* (2013.01); *B60G 2202/413* (2013.01); *B60G 2300/082* (2013.01)

(58) Field of Classification Search
CPC .......... B60G 17/0152; B60G 17/0165; B60G 17/04; B60G 17/08; B60G 2300/082; B60G 2202/413; B60G 11/265; B60G 13/08
See application file for complete search history.

(56) References Cited

U.S. PATENT DOCUMENTS

| | | | | |
|---|---|---|---|---|
| 3,592,485 A | * | 7/1971 | Buhl | 280/6.159 |
| 3,836,161 A | * | 9/1974 | Buhl | 280/6.153 |
| 3,917,295 A | | 11/1975 | Hiruma | |
| 3,953,040 A | * | 4/1976 | Unruh et al. | 280/6.151 |
| 3,992,035 A | * | 11/1976 | Dezelan et al. | 280/683 |
| 4,341,397 A | * | 7/1982 | Morimura et al. | 280/124.106 |
| 4,415,179 A | * | 11/1983 | Marinelli | 280/124.116 |
| 4,733,876 A | * | 3/1988 | Heider et al. | 280/6.158 |
| 5,458,359 A | * | 10/1995 | Brandt | 280/124.111 |
| 5,513,875 A | * | 5/1996 | Tahara et al. | 280/124.162 |
| 5,639,119 A | * | 6/1997 | Plate et al. | 280/754 |
| 5,879,016 A | * | 3/1999 | Altherr et al. | 280/124.112 |
| 6,145,859 A | | 11/2000 | Altherr et al. | |
| 6,470,991 B1 | | 10/2002 | Bowman et al. | |
| 6,520,277 B1 | | 2/2003 | Bowman et al. | |
| 6,523,844 B2 | * | 2/2003 | Panizzolo | 280/124.111 |
| 6,637,762 B2 | * | 10/2003 | Bublies et al. | 280/124.11 |
| 7,204,340 B2 | * | 4/2007 | Bordini | 180/372 |

(Continued)

FOREIGN PATENT DOCUMENTS

| | | | | |
|---|---|---|---|---|
| EP | 512550 A2 | * | 11/1992 | B60G 9/00 |
| EP | 1234696 A1 | | 8/2002 | |
| FR | 2918928 A1 | | 1/2009 | |

OTHER PUBLICATIONS

European Search Report dated Dec. 23, 2015 in foreign counterpart application No. 15180604.9 (7 pp.).

*Primary Examiner* — Laura Freedman (57) ABSTRACT

An axle suspension supports an axle housing on a vehicle frame. The suspension includes left and right pivot rods attached to left and right frame members. A suspension arm has a first end fixed to a rear end of the axle housing and has a second end pivotally coupled to the left and right pivot rods. A variable length left hydraulic cylinder has an upper end pivotally coupled to the left frame member and has a lower end pivotally coupled to a front end of the axle housing. A variable length right hydraulic cylinder has an upper end pivotally coupled to the right frame member and has a lower end pivotally coupled to the front end of the axle housing. The left and right hydraulic cylinders are hydraulically connected in parallel.

14 Claims, 6 Drawing Sheets

(56) References Cited

U.S. PATENT DOCUMENTS

| | | | |
|---|---|---|---|
| 7,398,984 B2* | 7/2008 | Tucker | 280/124.116 |
| 7,510,198 B2* | 3/2009 | Rach et al. | 280/124.112 |
| 7,516,968 B2* | 4/2009 | Cortez et al. | 280/124.116 |
| 8,490,992 B2* | 7/2013 | Juriga | 280/124.163 |
| 8,517,394 B2* | 8/2013 | Pfiffner et al. | 280/5.514 |
| 8,668,215 B2* | 3/2014 | Juriga | 280/124.174 |
| 8,919,789 B2* | 12/2014 | Nelson et al. | 280/6.156 |
| 2005/0269796 A1* | 12/2005 | Sawarynski et al. | 280/124.174 |

* cited by examiner

AXLE SUSPENSION

FIELD

The present disclosure relates to an axle suspension, and particularly to a front axle suspension for a work vehicle.

BACKGROUND

Under certain conditions, some tractors, including 4 wheel drive tractors, can experience an instability known as "power hop". During a power hop event, the tractor is excited and begins to jump and bounce during field operations due to specific soil and tire interactions. Once power hop is excited, it continues to build in amplitude until the operator reduces speed, raises the implement or stops. Power hop decreases ride comfort and causes loss of traction. Traditionally the operator would have to adjust ballast and/or tire pressure to attenuate the power hop. It is desired to provide an axle suspension system for a four wheel drive articulated tractor which allows attenuation of power hop so that ride comfort can be improved.

SUMMARY

According to an aspect of the present disclosure, an axle suspension couples an axle housing to a vehicle frame. The suspension includes a left pivot rod attached to a left frame member, and a right pivot rod attached to a right frame member. The suspension also includes a suspension arm having a first end fixed to a rear end of the axle housing and having a second end pivotally coupled to the left and right pivot rods. The suspension also includes variable length left and right hydraulic cylinders. The left hydraulic cylinder has an upper end pivotally coupled to the left frame member and has a lower end pivotally coupled to a rear end of the axle housing. The right hydraulic cylinder has an upper end pivotally coupled to the right frame member and has a lower end pivotally coupled to a rear end of the axle housing. The left and right hydraulic cylinders are connected hydraulically in parallel.

As a result, the axle housing can pivot with respect to the frame only about a single pivot axis which is the common axis of the left and right pivot rods, and which is perpendicular to a fore-and-aft axis of the frame. Thus, with this axle suspension, the hydraulic cylinders can be controlled to attenuate power hop and provide better ride comfort on a 4WD articulated tractor. This axle suspension does not increase the width of the tractor, and the correct wheel spacing for row crop usage can be maintained. The invention provides a front axle suspension which compliments the gudgeon oscillation on a 4WD articulated tractor.

DETAILED DESCRIPTION OF THE DRAWINGS

Figure 1:
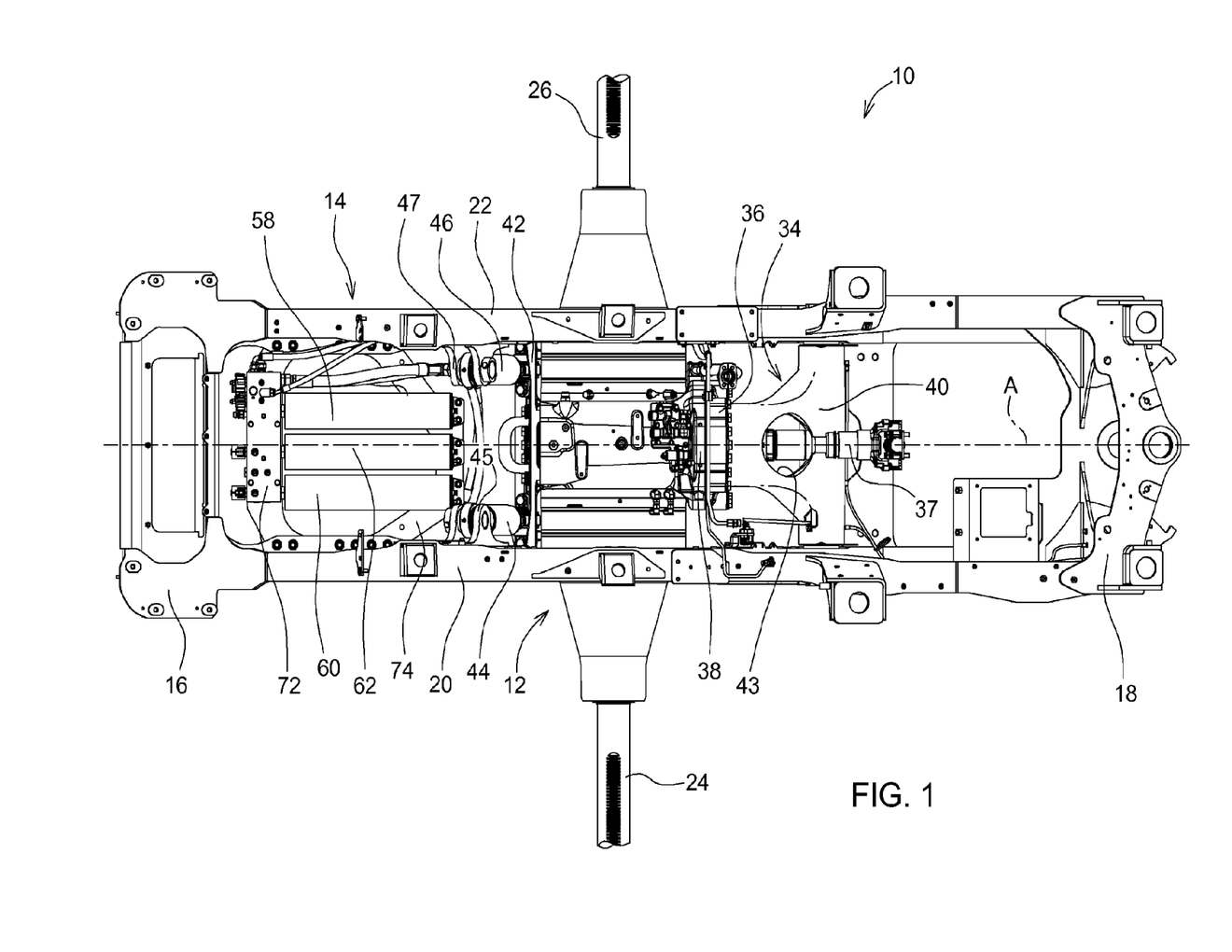
FIG. 1 is a top view of a front axle suspension embodying the invention.
Figure 2:
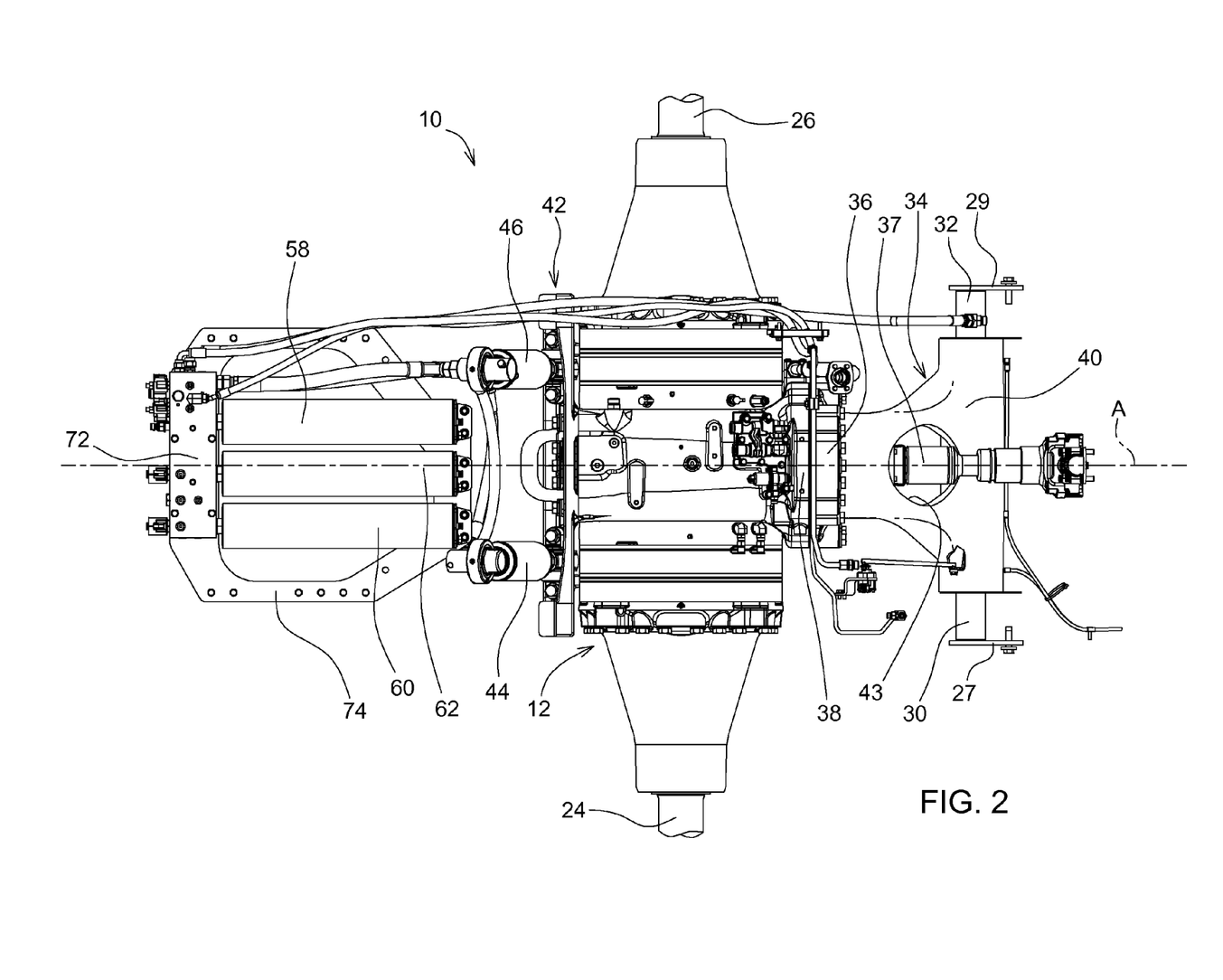
FIG. 2 is a top view of the front axle suspension of FIG. 1 with the frame removed.
Figure 3:
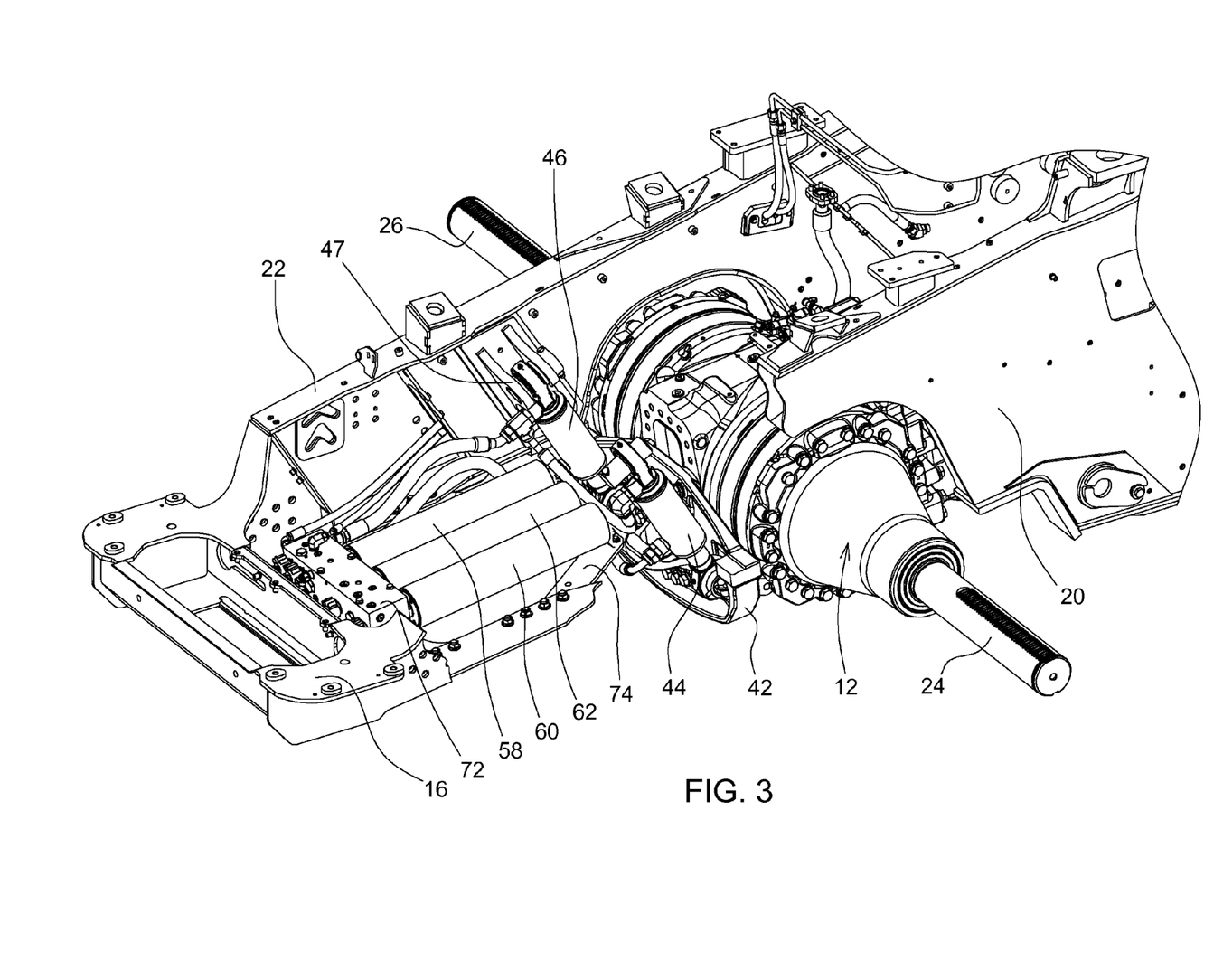
FIG. 3 is a perspective view of a portion of the front axle suspension of FIG. 1.

Referring to FIGS. 1, 2 and 3, an axle suspension 10 couples an axle housing 12 to a vehicle frame 14. The frame 14 includes a front frame member 16, a rear frame member 18, a left frame member 20 and a right frame member 22. The left and right frame members 20, 22 are substantially parallel to a fore-and-aft axis A of the vehicle. The axle housing 12 supports a left axle shaft 24 and a right axle shaft 26.

The suspension 10 includes a left pivot rod 30 attached to the left frame member 20, and a right pivot rod 32 attached to the right frame member 22. The suspension 10 also includes a suspension arm 34 having a first end 36 fixed to a rear end 38 of the axle housing 12 and having a second end 40 pivotally coupled to the left and right pivot rods 30 and 32. Preferably, the pivot rods 30, 32 have a common axis which is perpendicular to a fore-and-aft axis A of the frame 14 and which is parallel to the axis of the axle shafts 24 and 26. Alternatively, the separate pivot rods 30, 32 could be replaced by a single pivot rod (not shown) with opposite ends attached to the left and right frame members 20 and 22. The suspension arm 34 includes a central opening 43 through which extends the drive shaft 37.

Figure 6:
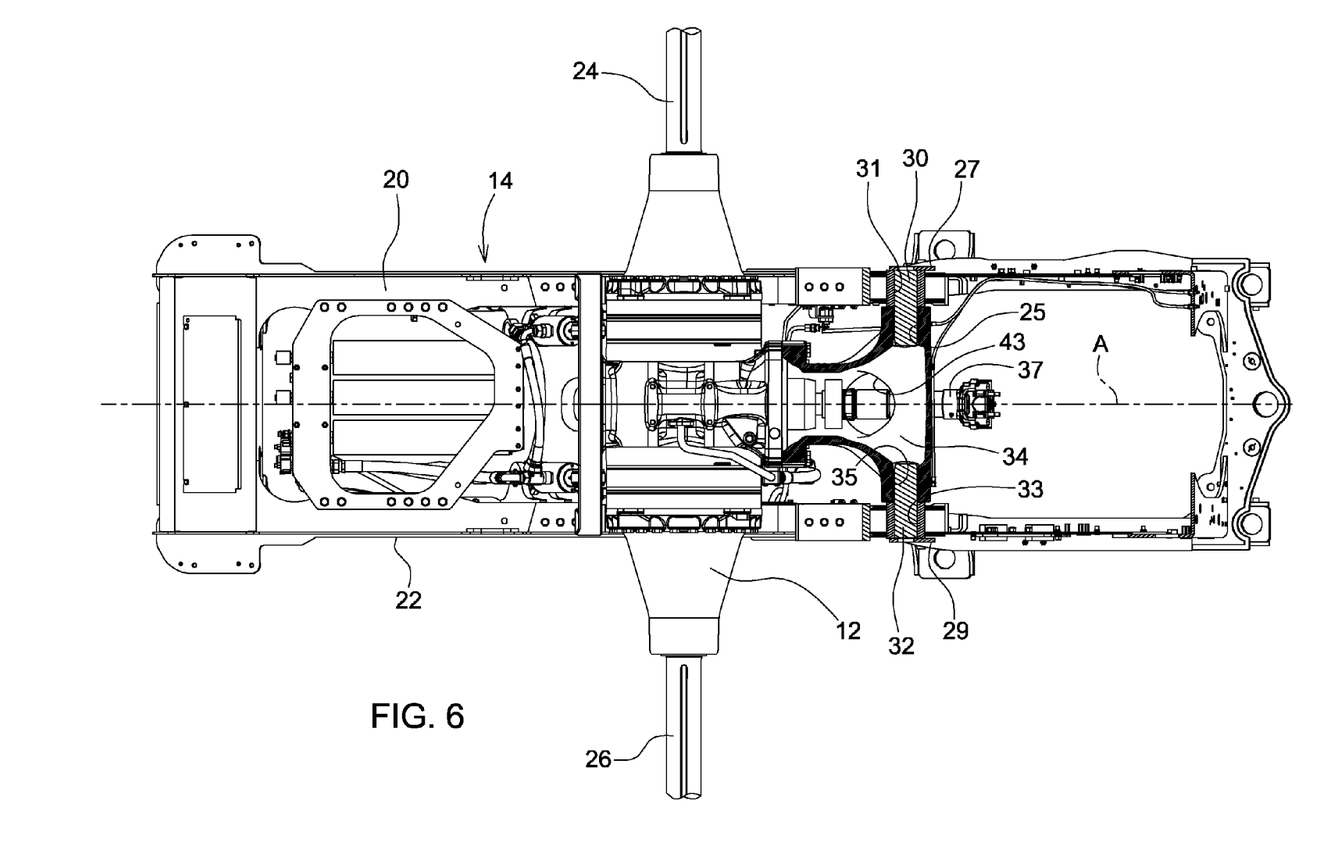
FIG. 6 is a bottom partially sectioned view of the front axle suspension of FIG. 1.

As best seen in FIG. 6, pivot rod 30 includes a flange 27 which is attached to an outer surface of left frame member 20, and pivot rod extends through a bore 31 formed by the left frame member 20 as is rotatably received by a bore 25 formed in the arm 34. Similarly, pivot rod 32 includes a flange 29 which is attached to an outer surface of right frame member 22, and pivot rod 32 extends through a bore 33 formed by the right frame member 22 as is rotatably received by a bore 35 formed in the arm 34.

The suspension 10 also includes an attaching member 42 which is fixed to the front end of the axle housing 12. The suspension 10 also includes variable length left and right hydraulic cylinders 44 and 46. The left hydraulic cylinder 44 has an upper end pivotally coupled by bracket 45 to the left frame member 20 and has a lower end pivotally coupled to a lower left part of the attaching member 42. The right hydraulic cylinder 46 has an upper end pivotally coupled by bracket 47 to the right frame member 22 and has a lower end pivotally coupled to a lower right part of the attaching member 42.

Figure 4:
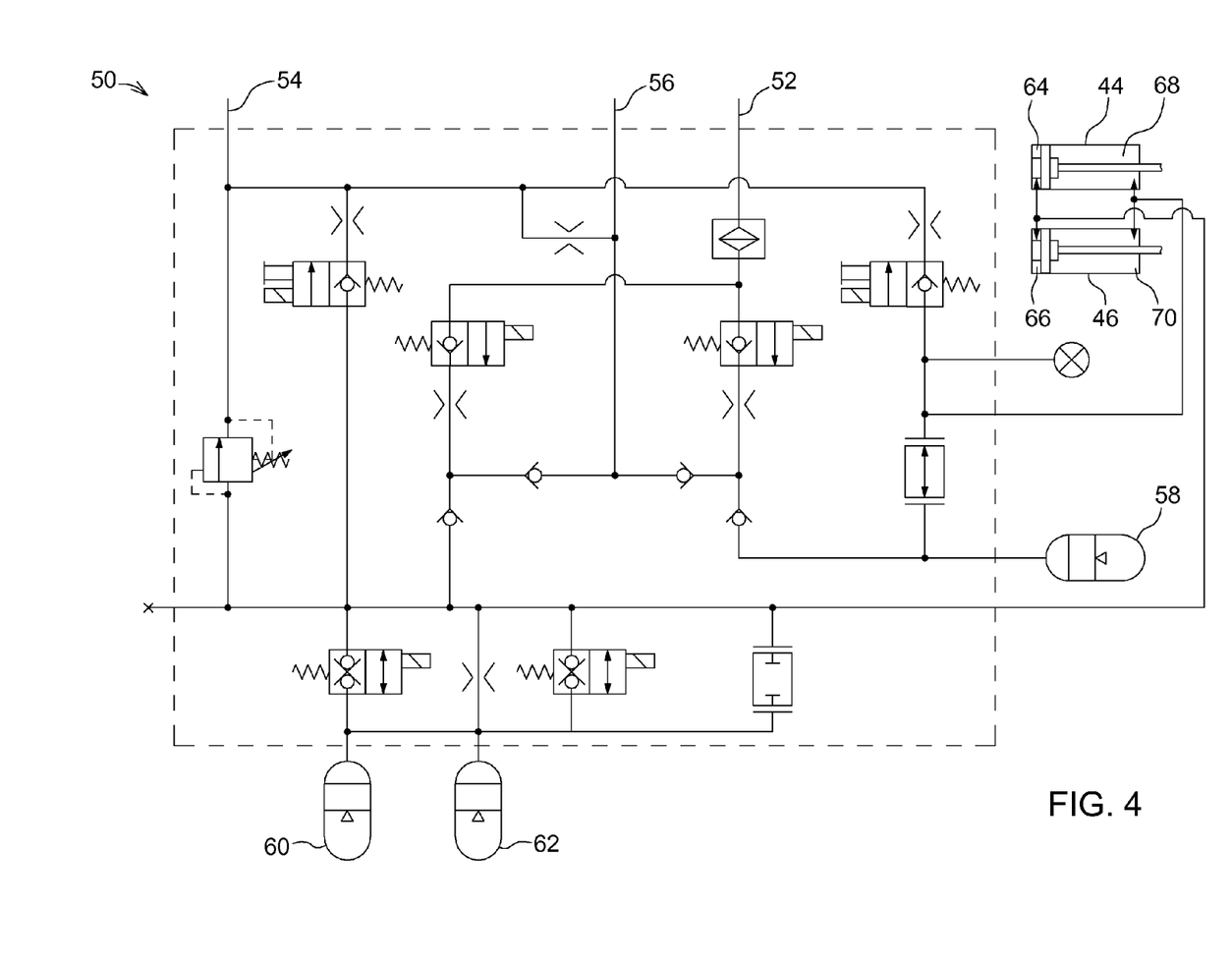
FIG. 4 is a schematic diagram of a hydraulic circuit which includes the hydraulic components of FIG. 1.

Referring now to FIG. 4, the cylinders 44 and 46 are connected hydraulically in parallel, and are connected to a known hydraulic valve control circuit 50. Circuit 50 controls communication of hydraulic fluid from a pump line 52, a tank line 54, a load sense line 56 to cylinders 44 and 46, to a rod accumulator 58 and a pair of piston accumulators 60 and 62. Thus, cylinder 44 includes a piston chamber 64 connected to a piston chamber 66 of cylinder 46, and cylinder 44 includes a rod chamber 68 connected to a rod chamber 70 of cylinder 46.

Figure 5:
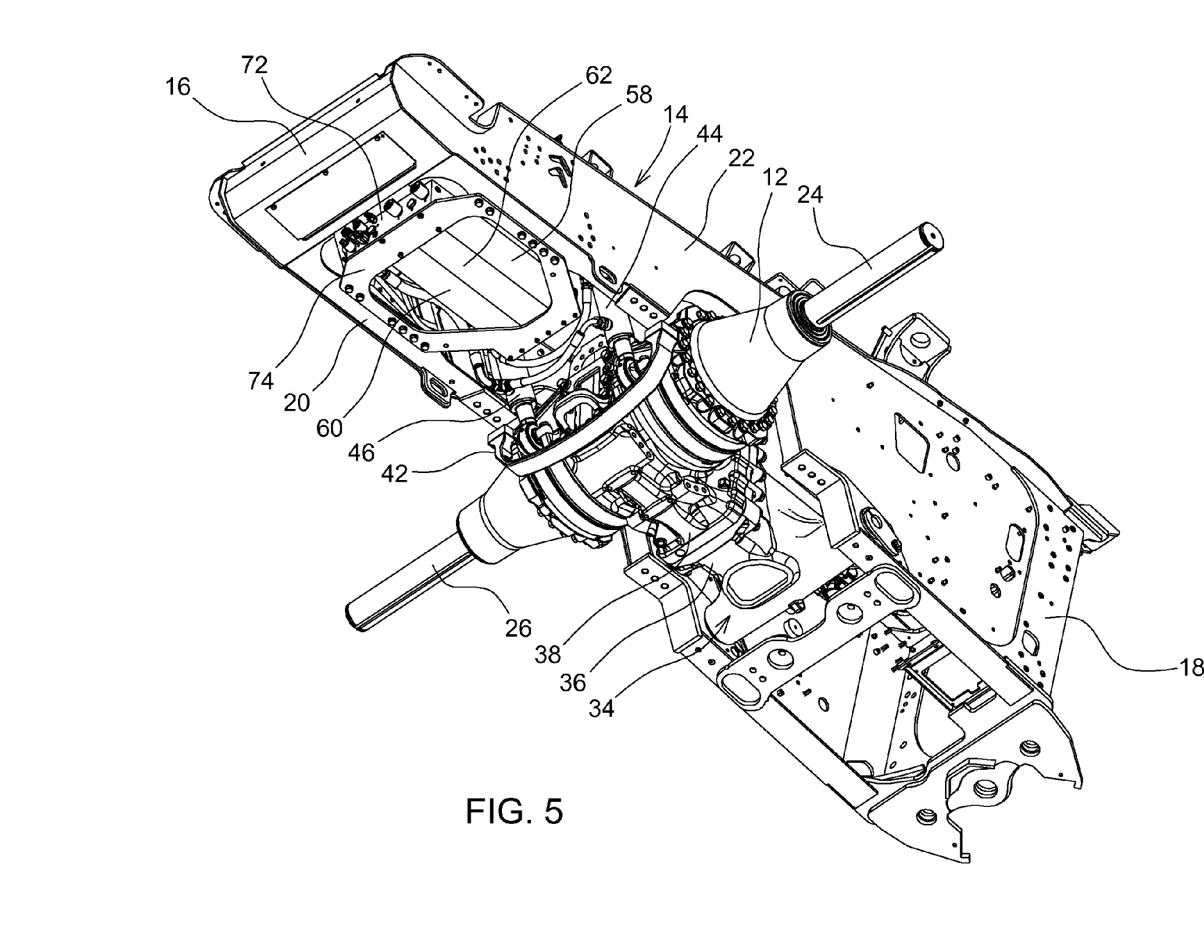
FIG. 5 is a bottom perspective view of the front axle suspension of FIG. 1.

As best seen in FIGS. 1-3, a valve housing 72 is mounted to a support member 74. As best seen in FIG. 5, the support member 74 is attached to a bottom surface of left and right frame members 20 and 22. The valve housing 72 is spaced apart from and adjacent to the front frame member 16 and forward of the axle housing 12. One end of the accumulators 58, 60 and 62 is connected to the valve housing 72. The other end of the accumulators 58, 60 and 62 are attached to the support member 74. The accumulators 58, 60 and 62 are positioned between the valve housing 72 and the attaching member 42. The components of the control circuit 50 may be enclosed within the valve housing 72. The accumulators 58, 60 and 62 may be are nitrogen accumulators.

The accumulators 58, 60 and 62 act as springs for the suspension system 10. The hydraulic control circuit 50 includes a valve which can limit movement by blocking flow between the cylinders 44, 46 and accumulators 58, 60 and 62. Oil is forced to move through a small orifice which provides damping and a partial locking feature for the suspension. The circuit 50 may also operate to level the suspension height by adding or subtracting oil from the cylinders. Suspension damping is achieved through the valve passage orifice sizing in the cylinder ports.

Thus, with this axle suspension 10, the hydraulic cylinders can be controlled by the circuit 50 to attenuate power hop and provide better ride comfort on a 4WD articulated tractor. The suspension 10 has a single degree of freedom and the movement of the front axle can be controlled by the hydraulic cylinders.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. An axle suspension for supporting an axle housing with respect to a vehicle frame having a fore-and-aft axis, the axle housing supporting left and right axle shafts which extend perpendicularly with respect to the fore-and-aft axis, the suspension comprising:
    a suspension arm having a first end fixed to a first end of the axle housing and having a second end pivotally coupled to the frame about a pivot axis which is perpendicular with respect to the fore-and-aft axis;
    a variable length left hydraulic cylinder having an upper end pivotally coupled to a left part of the frame and having a lower end pivotally coupled to the axle housing; and
    a variable length right hydraulic cylinder having an upper end pivotally coupled to a right part of the frame and having a lower end pivotally coupled to the axle housing;
    wherein the suspension arm is fixed to a rear end of the axle housing, the left hydraulic cylinder is pivotally coupled to a left front portion of the axle housing, and the right hydraulic cylinder is pivotally coupled to a right front portion of the axle housing.

2. The axle suspension of claim 1, wherein:
    the left and right hydraulic cylinders are hydraulically connected in parallel.

3. The axle suspension of claim 1, wherein:
    the frame comprises a front frame member, a rear frame member, a left frame member and a right frame member;
    a left pivot rod is attached to the left frame member;
    a right pivot rod is attached to the right frame member; and
    the second end of the suspension arm pivotally receives the left and right pivot rods.

4. The axle suspension of claim 1, wherein:
    a valve housing is mounted to the frame; and
    hydraulic components are mounted to the valve housing between the valve housing and a front end of the axle housing.

5. An axle suspension for supporting an axle housing on a vehicle frame, the suspension comprising:
    a left pivot rod attached to a left frame member;
    a right pivot rod attached to a right frame member;
    a suspension arm having a first end fixed to a rear end of the axle housing and having a second end pivotally coupled to the left and right pivot rods;
    a variable length left hydraulic cylinder having an upper end pivotally coupled to the left frame member and having a lower end pivotally coupled to a front end of the axle housing; and
    a variable length right hydraulic cylinder having an upper end pivotally coupled to the right frame member and having a lower end pivotally coupled to the front end of the axle housing.

6. The axle suspension of claim 5, wherein:
    the left and right hydraulic cylinders are hydraulically connected in parallel.

7. The axle suspension of claim 5, wherein:
    the left and right frame members are connected together by a front frame member and a rear frame member.

8. The axle suspension of claim 5, wherein:
    a valve housing is mounted to the frame; and
    hydraulic components are mounted to the valve housing between the valve housing and a front end of the axle housing.

9. The axle suspension of claim 8, wherein:
    the hydraulic components comprise a rod accumulator and a pair of piston accumulators.

10. An axle suspension for supporting an axle housing with respect to a vehicle frame having a fore-and-aft axis, the axle housing supporting left and right axle shafts which extend perpendicularly with respect to the fore-and-aft axis, the suspension comprising:
    a suspension arm having a first end fixed to a first end of the axle housing and having a second end pivotally coupled to the frame about a pivot axis which is perpendicular with respect to the fore-and-aft axis;
    a variable length left hydraulic cylinder having an upper end pivotally coupled to a left part of the frame and having a lower end pivotally coupled to the axle housing; and
    a variable length right hydraulic cylinder having an upper end pivotally coupled to a right part of the frame and having a lower end pivotally coupled to the axle housing;
    wherein a valve housing is mounted to the frame and hydraulic components are mounted to the valve housing between the valve housing and a front end of the axle housing.

11. The axle suspension of claim 10, wherein:
    the left and right hydraulic cylinders are hydraulically connected in parallel.

12. The axle suspension of claim 10, wherein:
    the frame comprises a front frame member, a rear frame member, a left frame member and a right frame member;
    a left pivot rod is attached to the left frame member;
    a right pivot rod is attached to the right frame member; and the second end of the suspension arm pivotally receives the left and right pivot rods.

13. The axle suspension of claim 10, wherein:
the suspension arm is fixed to a rear end of the axle housing.

14. The axle suspension of claim 10, wherein:
the suspension arm is fixed to a rear end of the axle housing,
the left hydraulic cylinder is pivotally coupled to a left front portion of the axle housing, and
the right hydraulic cylinder is pivotally coupled to a right front portion of the axle housing.

\* \* \* \* \*